No. 733,710. PATENTED JULY 14, 1903.
C. E. FIELD.
WIND MOTOR.
APPLICATION FILED SEPT. 10, 1902.
NO MODEL. 3 SHEETS—SHEET 1.
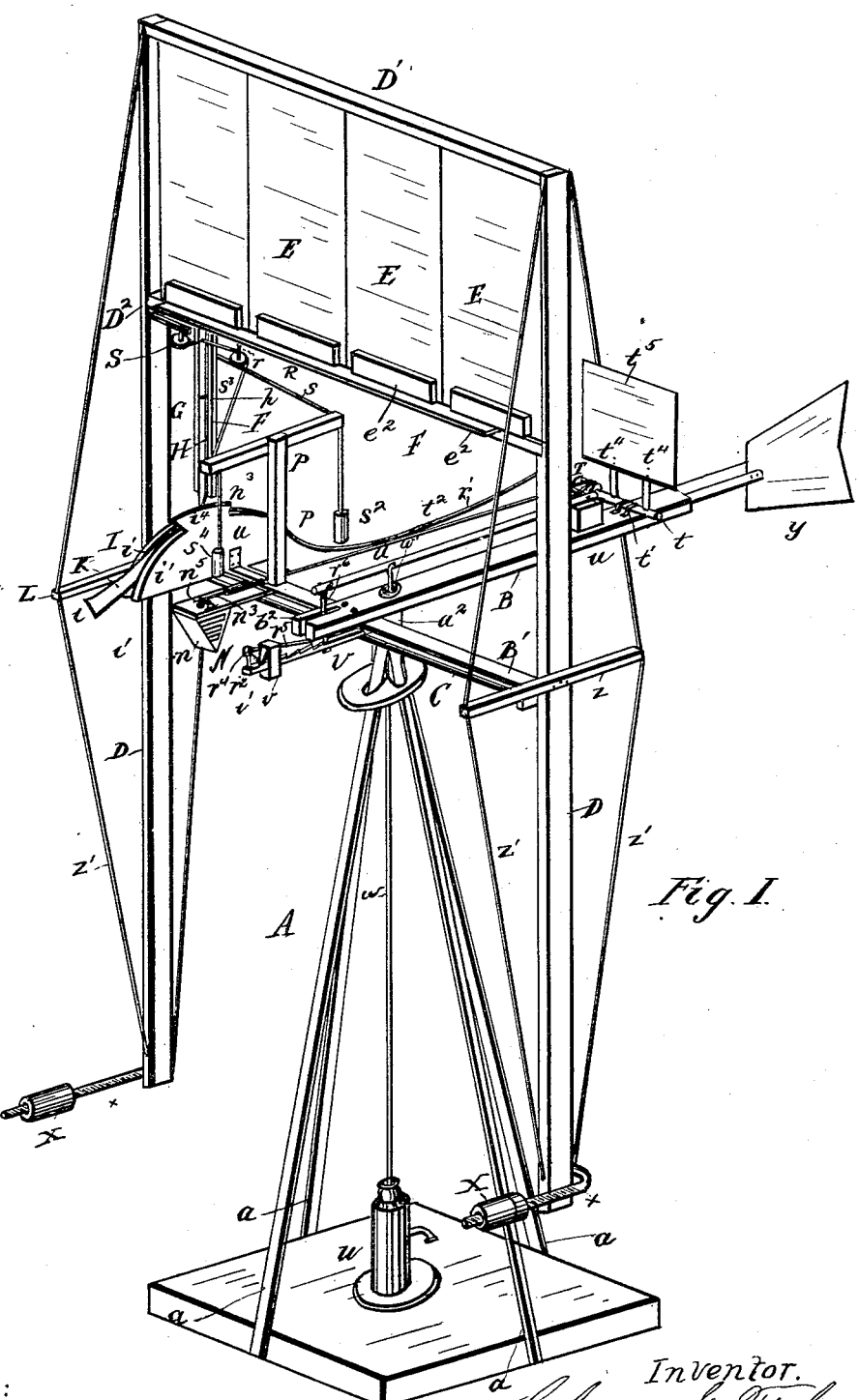
Fig. I.
Witnesses:
Theodore C. Sparks.
Chas. H. Manning.
Inventor.
Claude E. Field
By Rich'd V. Manning Atty.

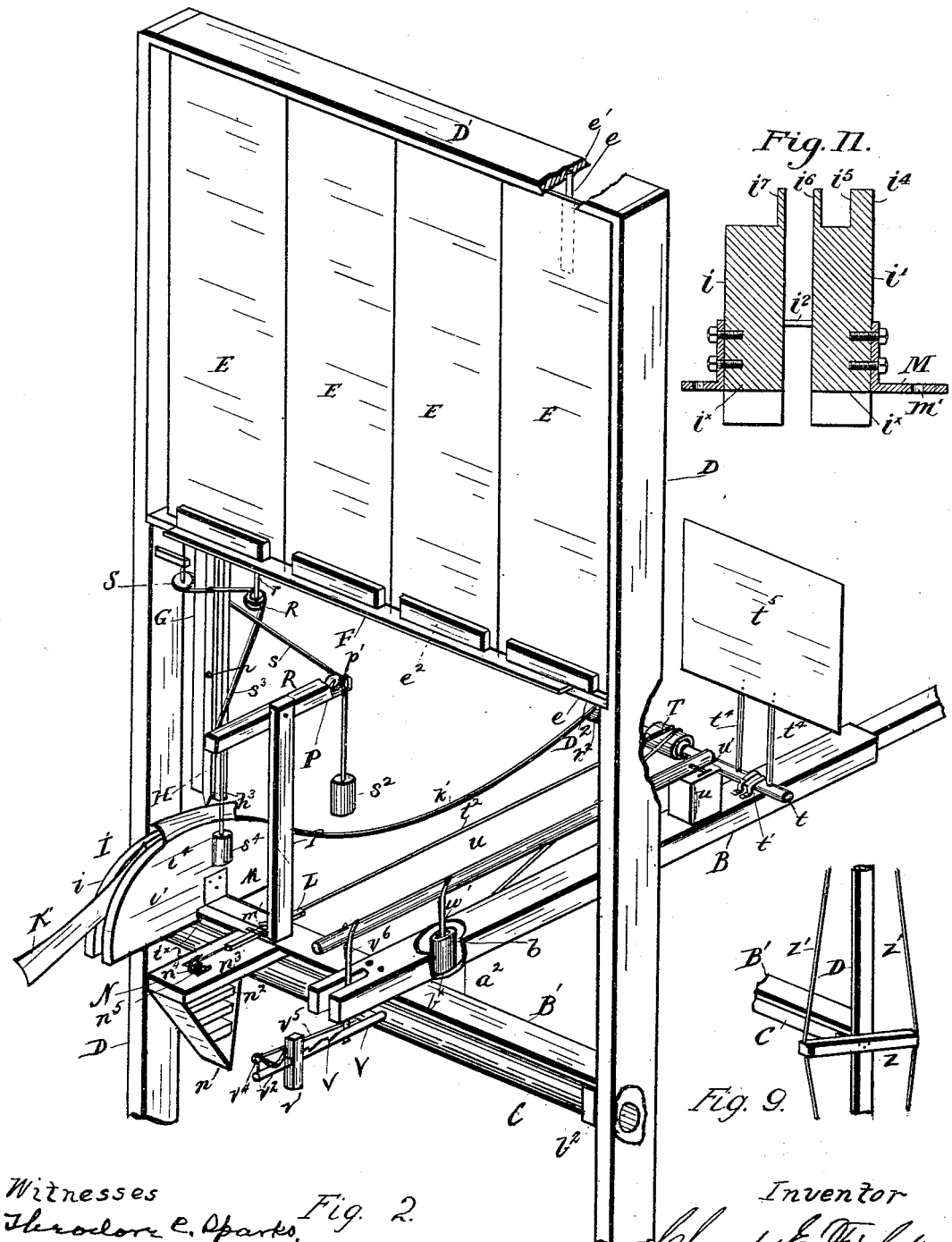

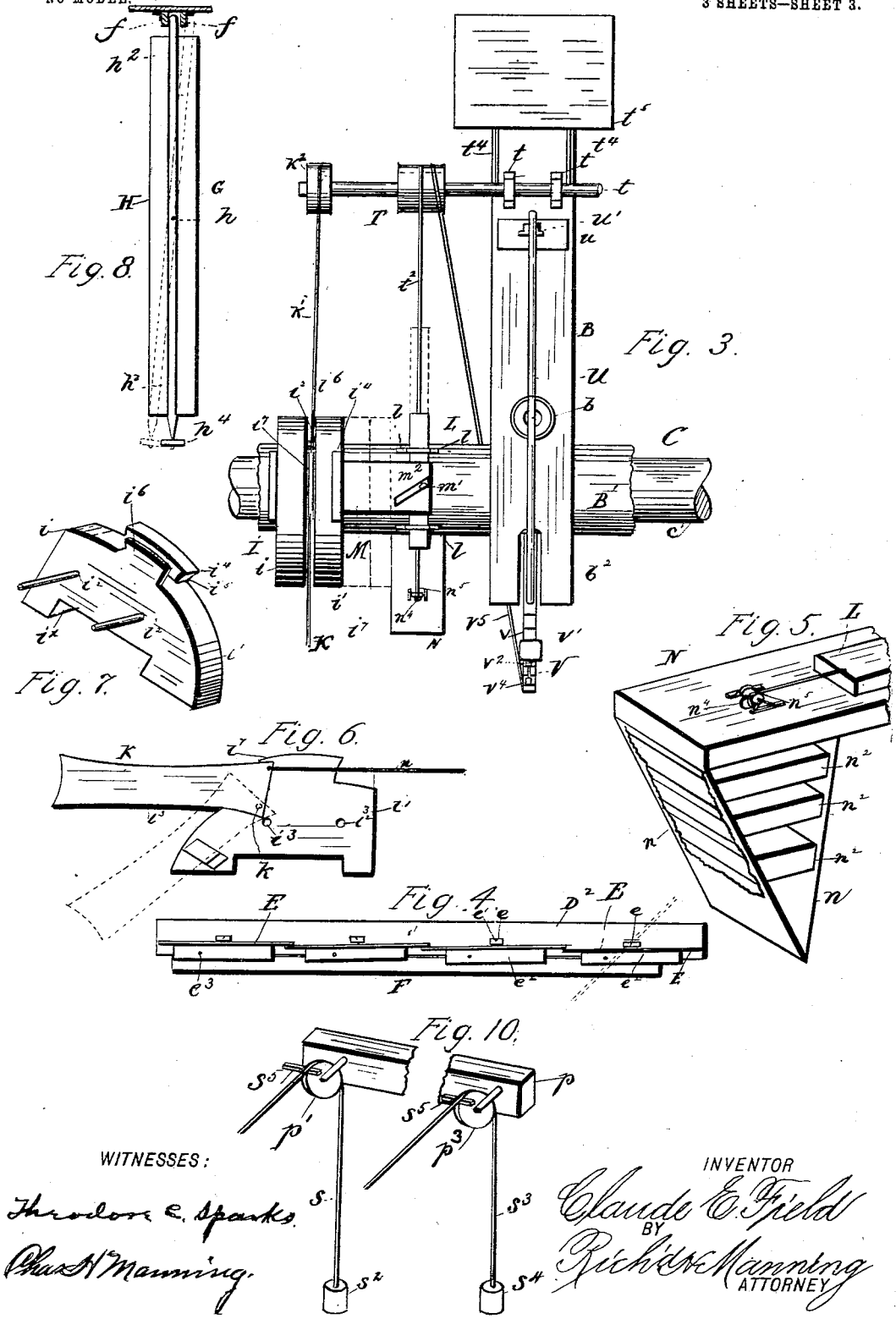

No. 733,710. Patented July 14, 1903.

UNITED STATES PATENT OFFICE.

CLAUDE E. FIELD, OF SLATER, MISSOURI.

WIND-MOTOR.

SPECIFICATION forming part of Letters Patent No. 733,710, dated July 14, 1903.

Application filed September 10, 1902. Serial No. 122,783. (No model.)

*To all whom it may concern:*

Be it known that I, CLAUDE E. FIELD, a citizen of the United States of America, residing at Slater, in the county of Saline and State of Missouri, have invented certain new and useful Improvements in Wind-Motors; and I do hereby declare that the following is a full, clear, and exact description of the invention, such as will enable others to make and use the same, reference being had to the accompanying drawings, forming a part of this specification.

The objects of my invention are, primarily, to transmit the force and impact of the wind for power utilization through alternately opening and closing wind-breast mechanism in oscillation; second, to control automatically the position of the shutters during an increase in the velocity of the wind; third, to impart an energizing forward movement to the shutters; fourth, to compensate for the increased resistance to the opening of the shutters in a return movement; fifth, to automatically control the motor so that its parts will feather the wind during a storm.

The invention consists in the novel construction and combination of parts, such as will be first fully described, and specifically pointed out in the claims.

In the drawings, Figure 1 is a view in perspective of the invention, showing the motor in position to be oscillated by the force of the wind and mechanically operated, respectively, and also the various positions of the shutters and mechanism controlling the action of the motor, the tower, the pumps, and the pump-rod actuated by the motor. Fig. 2 is an enlarged detail view in perspective of the main operating parts of the motor as seen at the upper end of the tower, the lower portion of the oscillating beams and of the tower being broken away. Fig. 3 is a detail plan view of the main supporting-beams of the motor upon the tower, showing a broken portion of the rock-shaft and the operative parts of the motor connected with said beams. Fig. 4 is a detail plan view of the lower transverse bar of the shutter-frame, showing the upper pivotal ends of the shutters and the shutter-operating bars. Fig. 5 is a detail view in perspective of the rack, showing the series of weights thereon. Fig. 6 is a detail view of the inner side of the fixed part of the guide-block, showing the guide-plates and openings for the guide-pins, also showing the track-closing plate and its position when open in dotted lines. Fig. 7 is a detail front view of the inner side of the movable part of the guide-block, showing the guide-block and pins. Fig. 8 is a detail view of the guiding trigger or bar of the motor, showing the guide-roller and stops on the shutter-operating bar. Fig. 9 is a detail view of a portion of the oscillating bars of the motor, showing the truss cross-bar and truss-wires. Fig. 10 is a detail view of the transverse bar on the standards supporting the operating-weights, showing the pulley and weights. Fig. 11 is a vertical sectional view of the guide-blocks, taken upon the line $x\ x$ of Fig. 3.

Similar letters of reference indicate corresponding parts in all the figures of the drawings.

Referring to the drawings, A represents the motor-supporting tower, which consists of the standards $a\ a\ a\ a$, the lower ends of which are spread apart and extend within the ground a suitable distance. The upper ends extend a considerable distance above the ground, so as to afford an elevated position of the motor and obtain its effectual operation, and are inclined inwardly toward each other and are connected rigidly with the respective sides of the hollow block $a^2$, which block extends a short distance in height above the upper end of said standards and is provided with a shoulder $b^\times$.

B represents one of the main supporting-beams for the motor, which is mounted in a horizontal position upon the block $a^2$, said beam having an opening $b$ a short distance in rear of its forward end to receive the circular shoulder $b^\times$ at the upper end of said block, upon which the motor has a pivotal bearing. Connected rigidly with the under side of the forward end of the beam B, forward of the block $a^2$, is a transverse motor-supporting beam B', upon the ends of which are shaft-hangers $b^2$ $b^2$, which extend downwardly from the under side of said beam and support the rock-shaft C, the ends of which shaft extend a short distance beyond the lines of the ends of beam B'. With the ends of the rock-shaft C are connected in vertical planes and rigidly the oscillating bars D D of the motor, which are narrow in width and extend in length about an equal distance from their point of connection with shaft C to their outer ends. The upper ends of the bars D D are connected together by the transverse bar D'. With the inner surface of the bars D D, at an intermediate point from the upper end of said bars and the shaft C, are rigidly connected the ends of a transverse bar $D^2$, which, with the bars D D, D', and $D^2$, form a shutter-frame.

E E E E represent the series of automatically-operated shutters or vanes which form the wind-valve breast. These shutters extend in length from a position near the inner surface of the bar D' to a position near the upper surface of the bar $D^2$, and the longitudinal edges of the shutters overlap when closed, as in Fig. 4. Upon the rear side of each shutter E, at a point equidistant from the longitudinal edges of the shutter, is connected rigidly a bar $e$, in each end of which bar is a pivot $e'$, which extends a short distance within the inner surface of the bars D' $D^2$ and at a point a short distance in rear of the forward edges of said bars, so as to leave a space about the thickness of said block between the outer surface of the shutter E when closed in position and the forward edges of the bars D $D^2$. Upon the forward side of each shutter E and in line with the lower end of said shutter is screwed rigidly a flat bar $e^2$, which extends within a short distance of the longitudinal edges of each shutter. These bars $e^2$ extend a short distance in width beyond the forward edge of the bar $D^2$, and upon the under side of the series of bars $e^2$ is a longitudinal operating-bar F, which is connected with each bar by the pivot-bolts $e^3$, which extend vertically through the bars $e^2$ near one end of the bar and in the direction of the longitudinal edge of the shutter, moving forward to admit the passage of the wind. These bolts are eccentrically located in respect to the pivots $e'$ $e'$ of the shutter E, so that in the reciprocal movement of the bar F the shutters E are opened to such an extent as the mechanism controlling the shutters may impart. Upon the under side of the operating-bar F and near one end thereof are the transverse fixed guide-stops $f f$.

G represents a hanging support or plate, the upper end of which is rigidly connected with the under side and forward edge of the transverse bar $D^2$ in rear of the position of the guide-blocks $f f$ on the bar F, the lower edge extending downwardly. Upon the forward side of the plate G is pivoted at $h$ an oscillating bar or trigger H, the upper end $h^2$ of which trigger extends upwardly to a position between the guide-stops $f f$ on the bar F and the lower end $h^3$ downwardly a considerable distance below the pivot $h$ and the sides of said trigger inclined inwardly, and upon said trigger is a roller $h^4$.

I represents the trigger-controlling block on the beam B, which consists of separate semi-elliptical-shaped extension blocks or plates $i\ i'$, arranged in a parallel position on the upper surface of and in a transverse position to beam B' and directly beneath the lower end $h^3$ of the oscillating trigger H, the position of said lower end being such as to move in the oscillations of the shutter-frame in planes parallel with the elliptical surfaces of the parts $i\ i'$ of the guide-block I and also transverse thereto. The part $i$ of the block I is notched on its under side at $i^x$ to admit the beam B' and is arranged adjacent to the inner side of the oscillating bar D and is fixed in position, while the part $i'$ is also notched to fit the beam B' and is laterally adjustable in position. On the inner side of the movable part $i'$ are guide-pins $i^2 i^2$, which extend within the perforations $i^3 i^3$ on the inner surface of the part $i$ and permit the lateral movement of said part $i'$. On the curved surface of the movable part $i'$ of the guide-block I near its outer edge is a guide-plate $i^4$, which is short in length and extends upwardly a short distance and is located upon the highest point of the said part of the block, the inner surface of which extends from the surface of the block upwardly, as at $i^5$. On the inner side of the said part $i'$ is a plate $i^6$, nearly of the same length and opposite in position to the guide-block $i^4$, the lower part of which is flush with the surface of said side. On the inner side of the part $i$ of block I is a guide-plate $i^7$, which is of the same length as the plate $i^6$ and extends the same distance in height, the lower end being flush with the surface of said inner side of the part $i$ of the block. On the inner side of the part $i$ of the guide-block I is a forwardly-extended track-closing plate K, which is pivotally connected at $k$ with the inner side of the part $i$ of the block a short distance forward of the forward end of the plate $i^7$ and at a point on said plate near the lower edge and at its rear end, so that the raising in horizontal position of the plate will close the space between the respective opposite ends of said plates and the lowering in position will afford a wide space for the movement laterally of the lower end of the oscillating bar H. With the upper corner and rear end of plate K is connected one end of a rope $k'$ the other end of which extends loosely to the drum T and which is operated to close said track and put the motor out of operation either by the hand or automatically.

L represents a slidable bar within the guides $l\ l$ on the upper surface of the beam B' arranged in a transverse direction thereto and a short distance from the movable part $i'$ of the guide-block. Upon the outer side of the part $i'$ of the guide-block is connected the upwardly-bent inner end of a narrow plate M, the other end of which plate extends horizontally upon the upper surface of the slidable bar L, and in said plate is a slot $m'$ inclined at an oblique angle to said bar. In the bar is a pin $m^2$, which extends upwardly within the slot $m'$. The forward end of the slidable bar L extends a short distance beyond the line of the forward edge of the beam B', and connected with the said forward edge directly beneath the bar L is a forwardly-extended plate N. With the under side of the plate N is connected the upper ends of the sides $n\ n$ of a V-shaped rack $n$, which sides are the same in width as the plate N. Within the rack are a series of weights $n^2\ n^2\ n^2$, varying in length and arranged in a horizontal position and in tiers within the rack. The ends of the weights are inclined at the same angle as the inner surface of the box and being of different lengths they are retained by the sides of the box at about equal distances apart. With the weight lowest in position is connected one end of a rope $n^3$, the other end of which rope extends through the remaining weights and through a perforation $n^4$ in the plate N, thence over a pulley $n^5$ on said plate, and connected with the forward end of the slidable bar L. Upon the upper surface of beam B' and connected rigidly therewith upon the side of the slidable bar toward beam B' is a standard P, the upper end of which extends upwardly about two-thirds the distance toward the transverse bar $D^2$ of the shutter-frame, and upon said end is a horizontal bar $p$, extending in a transverse direction to beam B'. On the outer side and at each end of the bar $p$ are sheaves $p'\ p^3$.

Upon the under side of beam $D^2$, a short distance from the support G, is a sheave R, which is mounted on a journal $r$, extending downwardly from said beam. With the inner side of beam D, nearly in the same horizontal plane with the sheave R, is connected a sheave S. One end of a rope $s$ is connected with the upper end of the trigger H and extended over sheave S, thence in rear of the support G and over the sheave $p'$ on the rear end of the bar $p$, and thence downwardly a considerable distance, and a weight $S^2$ connected with said end of a sufficient power to operate the trigger. With the upper end of the trigger H is connected one end of a separate rope $S^3$, the other end of which rope extends over the sheave R, thence over the sheave $p^3$ on the forward end of the bar $p$, and a weight $S^4$, connected with said end. These weights $S^2\ S^4$ are normally in suspension, and in order to retain them I connect a pin or link $S^5$ with each rope which comes in contact with the sheave and sustains the weights $S^2\ S^4$, which act to oscillate the trigger.

Upon the rear end of the beam B is a transverse rock-shaft $t$, mounted in the bearings $t'\ t'$, and upon the end of said shaft, directly in the rear of the slidable bar L, is a drum T. Extending around drum T is a rope $t^2$, connecting these with one end, the other end being connected with the rear end of the bar L. With the shaft $t$ are connected the lower ends of the upwardly-extending vibrating arms $t^4\ t^4$, upon the forward side of which arms is connected a wind-actuated flat plate $t^5$, of considerable length and width, so as to be operated by the wind.

Upon beam B, a short distance in advance of the shaft $t$, is a fixed block $u$, upon which are lugs $u'\ u'$, between which is pivotally connected one end of a bar U, the forward end of which extends to a position nearly in line with the forward end of beam B. In the forward end of beam B is a longitudinal slot $b^2$, extending to the transverse beam B'. With the rock-shaft C, directly beneath the slot $b^2$, is rigidly connected one end of an arm V, the other end of which arm extends forwardly a considerable distance and is provided with notches $v$ upon its upper side at short distances from each other. Upon the arm V is a sliding weight $v'$, upon the forward side of which is a pawl $v^2$, which engages with the notches $v$, and upon the edge of which, at its upper end, is an arm $v^3$, which is pivotally connected with the side of the weight. Upon the lower end is an eye $v^4$, with which is connected one end of a rope $v^5$.

W represents an ordinary water-raising pump, shown upon the ground beneath the motor, and $w$ is the pump-rod, which extends upwardly through the hollow block $a^2$ on the tower, and is forked at $w'$ and said forked end pivotally connected with the bar U. The other end of rope $v^5$ is connected with the drum T. With the arm V on the rock-shaft is pivotally connected one end of a pin $v^6$, the other end of which pin extends upwardly through the slot $b^2$ in the beam B' and is pivotally connected with the forward end of the bar U.

Upon the lower ends of the oscillating bars D D of the motor and connected with the rear edge of said bars are the rods $x\ x$, which extend outwardly a short distance and then are bent at right angles and extended forwardly a considerable distance beyond the line of the forward edge of said bars. These rods are screw-threaded, and upon said rods are the adjustable internally-screw-threaded weights $x\ x$.

Upon the rear end of beam B' is a vertically-arranged wind-steering vane Y, which acts to keep the shutter in the face of the wind.

The bars D are provided on the outside portions and at a point just above the position of the shaft C with transverse truss-bars $z\ z$, through the ends of which are passed the truss wires or rods $z'\ z'$, the ends of which wires are connected with the respective upper and lower ends of the bars at the forward and rear edges, thus bracing the bars from side strains, which may occur in shifting positions.

In the operation of the motor the degree of force of the wind received upon the shutter E in the shutter-frame and the vibrating plate $l^5$ is proportionally extended to effect the rearward movement of the shutter E and frame at the upper end of the oscillating bars D D, and said plate $t^5$ and the angles of inclination are correspondingly greater or less. Upon the rearward movement of the shutters E E, which are normally in a closed position, a slack is occasioned in the rope s, connected with the trigger-bar H, and the rearward inclination of the support G causes the slack to be taken up in rope $s^3$, and the weight $s^4$ draws upon the upper end of the trigger H, moving the lower antifriction end in rear of the plates $i^6$ $i^7$ toward the outer edge of part $i$ of cam I, and at the same time the upper end of the trigger $r$ moves the bar F in the same direction of movement and feathering or opening the shutters E', so as to admit the passage of the wind through and past the forwardly-moving edges, as seen in Fig. 4. The release of the force of the wind upon the shutter E and also the gravitating force of the weights at the outer end of the rods $x$ $x$ at the lower end of the bars D D tend to oscillate the bars to a vertical position, this being assisted by the combined power exerted by the weight V, as further noted. Upon the return movement forward of the shutters E the roller $h^4$ on the lower end of the trigger H moves over the outer surface of the flanged guide $i^7$, the weight $s^4$ still exerting the force upon the trigger to keep the roller in contact with the guide or flange, and in the movement the bars D D reach their vertical position, the slack occasioned in the rope $S^3$ and the tension is communicated to the rope S, and the weight $S^2$, acting upon the trigger H, causes the roller $h^4$ to move past the forward end of the guide-plates $i^6$ and in the backward movement of the shutter-frame is in contact therewith. When the bars D D in a backward movement come into a vertical position, said last-named cord $S^2$ is taut, and as bars D D are moved rearwardly from said position they gradually lift weight $s^4$, which tends to oscillate the trigger H in an opposite direction from weight $S^2$, so that when the bars D D come into a position, say, about twenty-two and one-half degrees backward of the vertical position the roller $h^4$ comes to the forward end of its guide-plate $i^3$ on the part $i'$ of block I, and the trigger H is allowed to be pulled so as to cross the roller $h^4$ to the track in part $i'$ of block I, which opens the shutters, so they feather the wind, and the motor is ready for another oscillation. The function of the cords named and weights $S^2$ and $S^4$ is to open and close shutters as guided by guide-block I. By this means a force is stored as the bars D D oscillate that can be rendered immediately effective when said bars reach proper positions, and thus an immediate and quick manipulation of the shutters is had. Under normal condition of wind's velocity the bars D D oscillate back and forth through an arc of a circle of, say, about forty-five degrees, being equal on either side of a vertical position. When forward, the shutters are entirely closed, and the force of the wind blows them backward to a point about twenty-two and one-half degrees back of a vertical position, when the shutters feather the wind by being opened, as aforesaid, and the main wind-valve breast loses the force of the wind, and the bars D D then oscillate forward, impelled by the gravity of weights X X, placed at the lower ends of bars D D and in front of said bars a sufficient distance to move said bars D D to a point, say, about twenty-two and one-half degrees forward of a vertical position, when the shutters are closed, as heretofore explained, or are partially closed, as will be explained herein. The motor is then ready to receive the force of wind and repeat the oscillation. The weights X X on rods $x$ $x$ at the lower ends of bars D D can be adjusted by hand backward or forward to so shift the center of gravity of the oscillating beams D D that they will fall forward to a proper position, and the power thus caused by the oscillations of beams D D is conveyed to arm V to operate the pump-rod. To meet the changing velocity of the wind, so that the mechanism will deliver power uniform in tension and speed, and to automatically stop and feather the shutters in a dangerous stage of the wind, the motor is controlled, first, by the action of the slidable bar L and the plate $i^5$. When the slidable bar L is drawn backward by increased wind-pressure, the pin $m^2$, working against the inclined side of slot $m'$, pushes or moves the movable part or half-block $i'$ of guide-block I toward and close to fixed part $i$ of guide-block I. This movement brings the part $i$ and part $i'$ closer together and restricts the transverse oscillation of trigger H, so that as it crosses the guide-block I in front that it will not allow a full sweep of the trigger H, which has the effect to leave the shutters partially open to a greater degree as the wind-pressure on plate $t^5$ becomes greater. As the wind-pressure subsides the weights $n^2$ $n^2$ $n^2$ $n^2$ will settle back to normal places and the parts of guide-block I will open out wider to a normal position. The function of these devices is to utilize less and less wind-face surface in a ratio equal to its increased velocity or pressure. Second, in the V-shaped rack, as before explained, the lowest weight is of sufficient size to maintain the governor wind-plate $t^5$ in vertical position under normal wind velocity or pressure. When pressure gets greater than normal, it will rotate the drum T, which will pull the cords and slidable bar L backward and the lowest weight will be raised, which will pick up the next higher, and it the second weight higher, and so on. The function of the weights $n^2$ $n^2$ $n^2$ $n^2$ is to weigh the wind-pressure on plate $t^5$ and to determine the position of said plate. This backward-and-forward movement of bar L governs the motor by holding the shutters E E E E partially open to a degree that increases in an equal ratio with increase of wind-pressure, and vice versa. When the wind-pressure increases above normal, drum T rotates, as before explained, and pulls the cord which lifts pawl $v^3$ and raises it from the notch, so than when arm V is at its downward position the weight $v'$ will slide forward or outward from rock-shaft C until there is a slack in the cords, when the pawl will drop in a notch and hold the weight. When the wind velocity falls or pressure grows less, drum T will turn back and occasion a slack in the cord, and when arm V is at its upward position the weight $v'$ will fall back or toward the rock-shaft C as far as the slack will let it and the pawl will fall and hold it. The function of this sliding weight is to give to the motor a greater forward tendency in a high wind, which increased tendency is to compensate for the increased resistance the open shutters meet on their return movement, as it is plain that they have a necessary thickness. to make them strong and durable. The cord running from track-closing plate K to drum T has enough slack in it so that when the wind reaches a dangerous stage or storm it will lift said track-closing plate, so it will put the motor out of operation and cause all of its parts to feather the wind and put it in safe position.

The first and second governing devices cooperate, and I may dispense with either one or both, as the pendulum-like movement of the oscillating bars D D is with great regularity in both as to the number of oscillations in a given time and power, and an even and smooth movement results.

The truss-bars Z Z extend sidewise a considerable distance, so that when tightened they protect the motor against either forward, backward, or side strains.

It is obvious that various changes may be made in form and construction of the wind-motor described and that equivalents might be substituted for various gravity devices herein described.

It is plain that by releasing bar V from bar U the wind-motor can be turned upside down, so that the top part will come to an easy position for repairs or safety from storm.

The shutters E E are always abreast of the wind, being so controlled by the vane, and the motor moves in the arc of a circle as the direction of the wind changes upon the shoulder $b^4$ on the hollow block $b$.

Various modifications may also be employed within the scope of the invention.

Having fully described my invention, what I now claim as new, and desire to secure by Letters Patent, is—

1. In a wind-motor a pivoted main supporting-beam, a counterbalanced oscillating shutter-frame supported in suitable bearings on said beam, and pivoted shutters in said frame, shutter-operating devices connected with said shutters and wind-operated devices on the said main supporting-beam coacting with and actuating the said shutter-operating devices.

2. In a wind-motor, a main supporting-beam, a rock-shaft, and suitable bearings upon said supporting-beam, oscillating bars, shaft-hangers upon said bars fixedly connected with said shaft intermediate the ends of said bars, a shutter-frame at the upper end of said bars, and pivoted shutters in said frame, a shutter-operating bar, and devices upon the said main beam coacting with and operating said shutter-operating bar.

3. In a wind-motor, a main supporting-beam, a rock-shaft and suitable bearings upon said beam supporting said shaft, oscillating bars fixedly connected with said shaft intermediate the ends of said bars, a shutter-frame at the upper ends of said bars, pivoted shutters to said frame, and a shutter-operating bar, and stops upon said bar, a hanging support connected with the shutter-frame, and an oscillating trigger-bar pivotally connected with said hanging support and loosely connected at its upper end with the shutter-operating bar, and a guide-block upon said beam controlling the lower end of said trigger.

4. In a wind-motor, a main supporting-beam, a rock-shaft and suitable shaft-bearings upon said beam supporting said shaft, oscillating bars fixedly connected with said shaft, intermediate the ends of said bars, a shutter-frame at the upper ends of said bars pivoted shutters in said frame, a shutter-operating bar, a hanging support on the shutter-frame, an oscillating trigger-bar pivotally connected with said support and loosely connected at its upper end with the shutter-operating bar, a guide-block upon the main beam in the path of the lower end of the trigger-bar, and reciprocally-acting, power-transmitting devices on the main beam imparting a reciprocal movement to the oscillating bar.

5. In a wind-motor, a main supporting-beam, a rock-shaft, and suitable shaft-bearings upon said beams supporting said shaft, oscillating bars fixedly connected with said shaft intermediate the ends of said bars, a shutter-frame at the upper end of said bars, pivoted shutters on said frame, a shutter-operating bar, and suitable guide-blocks thereon, a hanging support on the shutter-frame, an oscillating trigger-bar pivotally connected with said support and extending between the guide-blocks in the shutter-operating bar, a guide-block on the main beam in the path of the lower end of the trigger-bar, an upright bar on the main beam, and weights suspended therefrom, sheaves on the oscillating bar adjacent to the trigger-bar and the support for the suspended weights, and separate ropes connected at one end with the upper end of the trigger-bar, one of which extends from the trigger-bar through the sheave on the oscillating bar and connected with one of the suspended weights, and the other rope extended from said bar and through the sheave on said support, and connected with the other suspended weight.

6. In a wind-motor the combination with a main supporting-beam of a counterbalanced frame journaled upon said beam, pivoted vanes in said frame, a depending support on said frame and a longitudinal centrally-pivoted trigger-bar on said support actuating said vanes at its upper end, mechanism for oscillating said bar on its pivot, separate fixed and movable guide-blocks on the main beam, guiding devices on said blocks in the path of the lower end of the trigger-bar and means substantially as described for adjusting the position of the movable guide-block.

7. A wind-motor comprising a main, transverse beam, and a longitudinal supporting-beam, a rock-shaft beneath the transverse beam, and shaft-bearings upon said beam supporting said shaft, oscillating bars fixedly connected with said rock-shaft intermediate the ends of said bars, a shutter-frame at the upper end of said bars and pivoted shutters therein, a shutter-operating bar pivotally connected with said shutters, and guide-stops thereon, a hanging support on the shutter-frame, and a pivoted, oscillating trigger-bar on said support, having an antifriction lower end, and an upright on the said main, transverse beam, and normally suspended weights on said uprights, and sheaves on said support and said oscillating bar, separate power-conveying ropes connected with the trigger-bar extending to and connected with the weights, one of which ropes extends through the sheave on said oscillating bar, an extension guide-block on the main beam beneath said trigger-bar having separate fixed and movable parts, and guide-plates on said block in the path of the lower end of the trigger-bar, a self-retracting, slidable bar on the main beam adjustably connected with the movable portion of said guide-block, a rock-shaft on the longitudinal beam, a wind-operated plate on said shaft, and devices on said shaft communicating power to the said slidable bar on the main beam.

8. In a wind-motor composed of oscillating bars, and a rock-shaft fixedly connected with said bars, intermediate the ends thereof, and wind-operated devices at the upper end of said bars, the combination of outwardly-extended screw-threaded rods at the lower ends of said bars, and internally-screw-threaded perforate weights on said rods.

9. A wind-motor comprising a suitable tower, a main transverse beam and a longitudinal beam supported thereby, a rock-shaft beneath the transverse beams, and suitable shaft-bearings upon said beams, oscillating bars fixedly connected with said rock-shaft intermediate the ends thereof, automatically-controlled wind-vanes upon the upper ends of said bars and gravitating devices on the lower ends, an arm on the rock-shaft, a vibrating bar pivoted at its rear end to a suitable support upon the rear end of the longitudinal beam and a link connecting the forward end of said vibrating bar with the arm of said rock-shaft, and a power-conveying rod connected with the said vibrating bar.

10. A wind-motor comprising a main, supporting-beam, a rock-shaft, and suitable bearings supporting said shaft, oscillating bars fixedly connected with said shaft intermediate the ends thereof, a shutter-frame and pivoted shutters within said frame, a shutter-operating bar and guide-stops thereon, a stationary support on the main beam, a pivoted oscillating trigger-bar on said support, having one end extending between the guide-stops on said shutter-bar, a guide-block on the main beam in the path of the lower end of said trigger-bar having separate parts, guide-plates on the inner side of said plates, means for oscillating said trigger-bar and a track-closing plate on the guide-block at the forward end of said block.

11. The combination with a guide-block for wind-motors having separate fixed and movable parts, and guide-plates on said parts of a forwardly-extended track-closing plate pivotally connected with the inner side of the fixed plate and having the rear end movable past the forward end of said plate.

12. A wind-motor comprising a main transverse beam and a longitudinal supporting-beam, a rock-shaft beneath the transverse beam and shaft-hangers on said beam supporting said shaft, oscillating bars fixedly connected with said rock-shaft intermediate the ends thereof, a shutter-frame at the upper ends of said bars and pivoted shutters therein, gravitating devices at the lower ends of said bars, means for opening and closing said shutters alternately, an arm on the rock-shaft having notches therein, a slotted weight on said arm, and a pawl on said weight engaging with said notches a rock-shaft on the main longitudinal beam a drum on said shaft, a vibrating bar pivoted at its rear end to a suitable support upon the said longitudinal beam a link connecting the forward end of said bar with the arm on the rock-shaft beneath the transverse beam, a cord connected with the said drum and extending through an eye on the arm of the rock-shaft carrying the movable weight and connected with said pawl substantially as described.

CLAUDE E. FIELD.

Witnesses:
FRANK E. RANSDELL,
WILLIAM F. RIGGS.